(12) United States Patent
Inoue

(10) Patent No.: US 7,692,566 B2
(45) Date of Patent: Apr. 6, 2010

(54) ANGLE DETECTION DEVICE

(75) Inventor: Tetsuji Inoue, Nagoya (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 24 days.

(21) Appl. No.: 12/149,228

(22) Filed: Apr. 29, 2008

(65) Prior Publication Data
US 2008/0309527 A1    Dec. 18, 2008

(30) Foreign Application Priority Data
Jun. 18, 2007    (JP) ............................... 2007-159946

(51) Int. Cl.
*H03M 1/48* (2006.01)
(52) U.S. Cl. .................. 341/116; 318/661; 318/605
(58) Field of Classification Search ................ 341/116, 341/112, 155, 5, 6; 318/605, 661
See application file for complete search history.

(56) References Cited

U.S. PATENT DOCUMENTS

| | | |
|---|---|---|
| 4,259,628 A | 3/1981 | Iwakane et al. |
| 4,795,954 A | 1/1989 | Sakurai et al. |
| 5,239,252 A * | 8/1993 | Runggaldier et al. ........ 318/806 |
| 5,796,357 A * | 8/1998 | Kushihara ................... 341/116 |
| 6,278,388 B1 * | 8/2001 | Kushihara ................... 341/112 |
| 6,925,401 B2 * | 8/2005 | Kameya ....................... 702/87 |
| 2006/0132338 A1 * | 6/2006 | Katakura et al. ............. 341/112 |

FOREIGN PATENT DOCUMENTS

| | | |
|---|---|---|
| JP | A-62-144021 | 6/1987 |
| JP | A-6-241834 | 9/1994 |
| JP | A-11-118520 | 4/1999 |
| JP | A-2004-61157 | 2/2004 |

* cited by examiner

*Primary Examiner*—Peguy JeanPierre
(74) *Attorney, Agent, or Firm*—Oliff & Berridge, PLC

(57) ABSTRACT

A resolver includes an excitation signal generator which generates a sine wave and a cosine wave as an excitation signal, a rotor which receives the excitation signal, and a rotary transformer which detects an output signal of the rotor, the resolver being arranged to detect angle information of the rotor. The resolver further includes a controller which outputs angle information at a zero cross point of the output signal detected by the rotary transformer. The resolver can provide high detection accuracy and be low in cost.

16 Claims, 8 Drawing Sheets

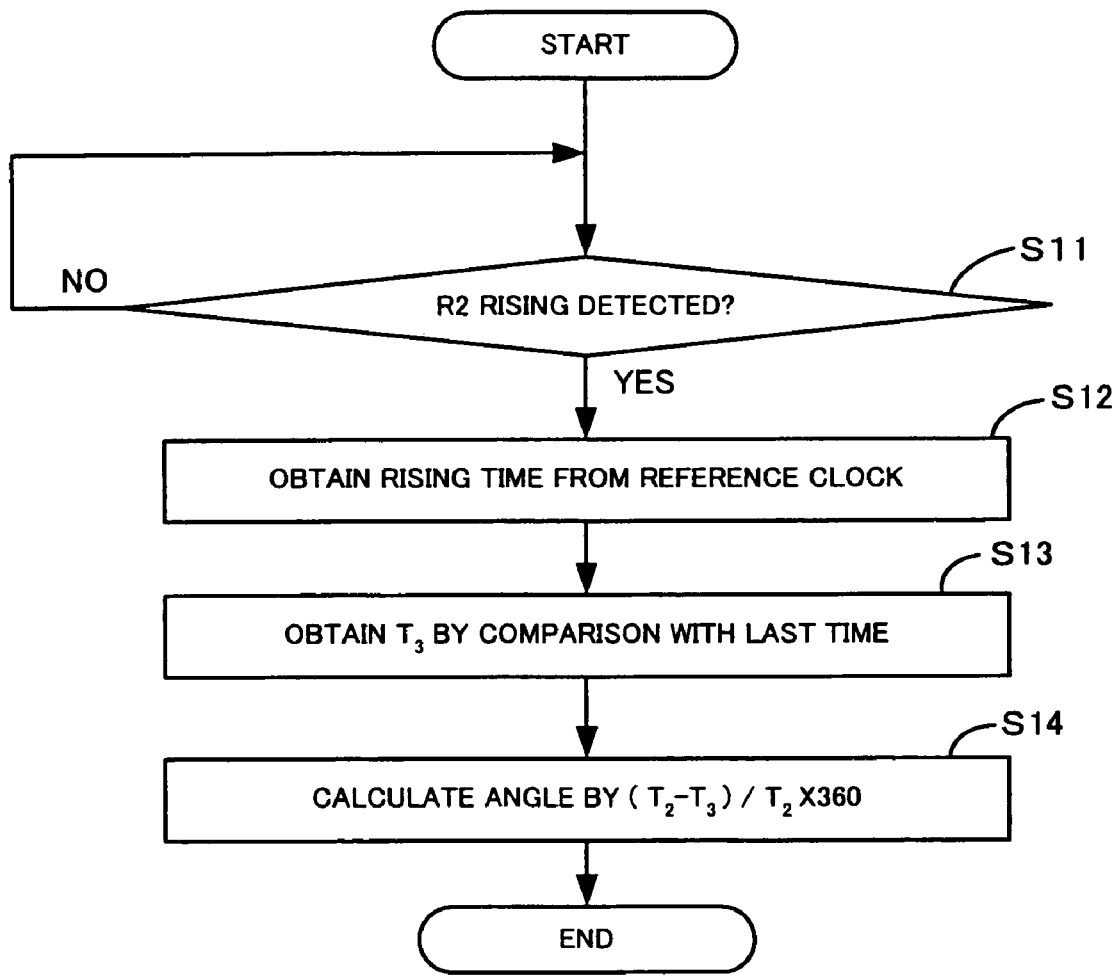

ANGLE DETECTION DEVICE

BACKGROUND OF THE INVENTION

1. Field of the Invention

The present invention relates to an angle detection device to be used for detecting rotation angles of an output shaft of a vehicle motor.

2. Description of Related Art

A high-power brushless motor has heretofore been used in a hybrid electric vehicle and an electric vehicle. To control such brushless motor mounted in the hybrid electric vehicle, it is necessary to sense an exact rotation position (angle) of an output shaft of a motor. This is because the rotation position of a rotor has to be precisely sensed to control switching of energization to each coil of a stator.

Regarding a vehicle, particularly, cogging causes poor drivability and hence a reduction in the cogging is demanded. To this end, accurate switching of energization is strongly requested.

For detection of the angle of a vehicle motor shaft, a resolver is used because it has various functions such as high-temperature resistance, noise resistance, vibration resistance, and high-humidity resistance. The resolver is built in the motor and directly mounted to the output shaft of the motor.

One of resolvers of this type is a variable reluctance resolver (VR resolver). The VR resolver is a resolver adapted to utilize changes in efficiency of a transformer caused by variations in a gap provided in a magnetic path. By designing the shape of the rotor so that the gap periodically changes relative to the rotation angle, an angle output can be detected without windings on a rotator side.

The VR resolver includes a stator in which an excitation coil and a detection coil are arranged and a rotor placed with its outer periphery being close to both coils. The detection coil is constituted by two coils whose phases are shifted 90° from each other. The excitation coil is energized with a sine wave AC current of several KHz. Two coils of the detection coil output induction voltage through the outer periphery of the rotor. Based on output amplitudes of the two induction voltages, the angle can be detected.

On the other hand, in a resolver using a phase difference method for detecting a rotation angle based on a phase difference of detection signals, a phase difference time will change due to temperature change or the like of the resolver, which deteriorates angle detection accuracy.

To solve this problem, JP11 (1999)-118520A proposes a method of detecting a rotation angle based on an amplitude ratio between detection signals at a certain time. This resolver of amplitude conversion type can sense an exact rotation angle at arbitrary timing and therefore is adopted as a resolver used in a hybrid electric vehicle.

BRIEF SUMMARY OF THE INVENTION

However, the conventional resolver used in the hybrid electric vehicle has the following disadvantages.

(A) The Resolver of Amplitude Conversion Type is High in Cost.

The resolver of amplitude conversion type disclosed in JP11-118520A is arranged to simplify a circuit configuration to calculate an amplitude ratio between detection signals at a certain time. However, it requires a high-speed A/D converter and conversion by Fourier transformation, which are large burden on a hardware side and a software side. Further, there is also a problem that total cost of a sensor system is still relatively high.

(B) A Problem of the Resolver of Phase Difference Type:

On the other hand, the method of detecting the rotation angle based on a phase difference between an excitation signal and a detection signal has the following two problems.

A first problem is that the frequency of the excitation signal includes errors and hence some errors are observed even if the phase difference time of the excitation signal and the detection signal is accurately measured by a counter, the rotation angle could only be detected with low accuracy.

A second problem is that the resistance and reactance of the resolver main body change when the temperature of the resolver becomes higher, causing the phase to change, leading to low angle detection accuracy. In the case where the resolver is mounted on a vehicle, the temperature of the motor will naturally rise and simultaneously the temperature of the resolver also increases together. As a result, the angle detection accuracy would be deteriorated as the temperature of the resolver rises.

To mount the resolver of phase difference detecting type, the above two problems have to be solved.

The present invention has been made in view of the above circumstances and has an object to provide an angle detection device capable of detecting rotary angles of a motor shaft used in a drive motor with high accuracy and in low cost.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

(1) To achieve the purpose of the invention, there is provided an angle detection device including: an excitation signal generator which generates a sine wave and a cosine wave as excitation signals; a rotor which receives the excitation signals and outputs a signal representing an angle of the rotor; a detection circuit which detects the output signal of the rotor, the resolver being adapted to detect angle information of the rotor; and a resolver/digital converter which outputs the angle information at a zero cross point of the output signal detected by the detection circuit.

Since the resolver/digital converter outputs the information on the instantaneous angle at the zero cross point of the output signal, no time lag will occur, unlike the instantaneous angle information at the zero cross point of the excitation signal. Thus, high detection accuracy can be achieved.

Furthermore, the rotor angle can be detected without additionally providing a complicated circuit, which contributes to a cost reduction.

(2) In the angle detection device (1), preferably, a rotation direction of the rotor is set so that the output signal of the rotor leads in phase with respect to the excitation signal.

In the case where the angle detection device is used for detection in a vehicle drive motor, it is possible to shorten the intervals of the zero cross points during vehicle forward movement as compared with the intervals of the zero cross points during vehicle stop.

Simultaneously, the rotor rotation direction during vehicle backward movement is set so that the output signal leads in phase relative to the excitation signal. The intervals of zero cross points during the vehicle backward movement become longer than those during vehicle stop.

The vehicle is, however, moved backward with less frequency. When the intervals during the forward movement are shortened to enhance the rotation angle detection accuracy, the rotation angle detection accuracy during backward movement is likely to slightly deteriorate. However, such deterioration will not cause any problem.

In the angle detection device (1) or (2), preferably, when the angle information is requested between the zero cross point and a next zero cross point, the angle information at a request time is estimated based on an immediate preceding angle change of the rotor.

In response to the request from a controller side (a vehicle-mounted CPU for vehicle control), accordingly, the information on the angle of the motor shaft at that moment can be transmitted.

At that time, the instantaneous angle is estimated based on the immediate preceding angle change, so that the angle detection accuracy can also be maintained at high level.

In the case where the angle detection device is mounted in a vehicle, it can meet the increasing needs for obtaining, at any given time, the angle of a vehicle drive motor rotating at high speed.

(4) In any one of the angle detection devices (1) to (3), preferably, the resolver is connected to an external CPU and uses a free running counter function and an input capture function of the CPU as the resolver/digital converter.

Accordingly, a general CPU may be used in place of a special resolver/digital converter. Some general CPUs are inexpensive. In the case where the angle detection device is mounted in a vehicle, a CPU for control of the vehicle may be utilized. Thus, the angle detection device will be provided at low cost.

(5) In the angle detection device (4), preferably, the excitation signal generator is arranged to generate the sine wave and the cosine wave in sync with a reference clock of the CPU.

Accordingly, the CPU can accurately detect the time of each zero cross point of the output signal.

For instance, even when the reference clock of the CPU lags or leads due to temperature drift, the reference clock of the same CPU as the resolver/digital converter is used for counting. It is therefore possible to detect the angle information without being affected by the internal temperature drift or the like.

(6) In the angle detection device (1), preferably, the angle information is calculated based on a ratio of a phase difference between the output signal of the rotor and the excitation signal and a period of the excitation signal.

Even when the resolver rises in temperature and hence the phase of the excitation signal changes, the phase of the detection signal simultaneously changes without changing the phase difference ratio between the excitation signal and the output signal. This makes it possible to cancel the phase change of the excitation signal which is caused by resolver temperature change and enhance the angle detection accuracy.

(7) In the angle detection device (1), preferably, the angle information is determined based on a time lag between a zero cross point of the excitation signal and a zero cross point of the output signal detected by a detection circuit.

Consequently, the angle information can be calculated by a simple calculation method. Since the angle information at each zero cross point of the output signal is calculated, the angle information can be output with little time lag and hence with enhanced accuracy.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 10 is a flowchart to briefly explain internal processing in a controller for vehicle control in the second embodiment.

DETAILED DESCRIPTION OF THE PREFERRED EMBODIMENTS

A detailed description of a preferred embodiment of the present invention will now be given referring to the accompanying drawings.

First Embodiment

Figure 1:
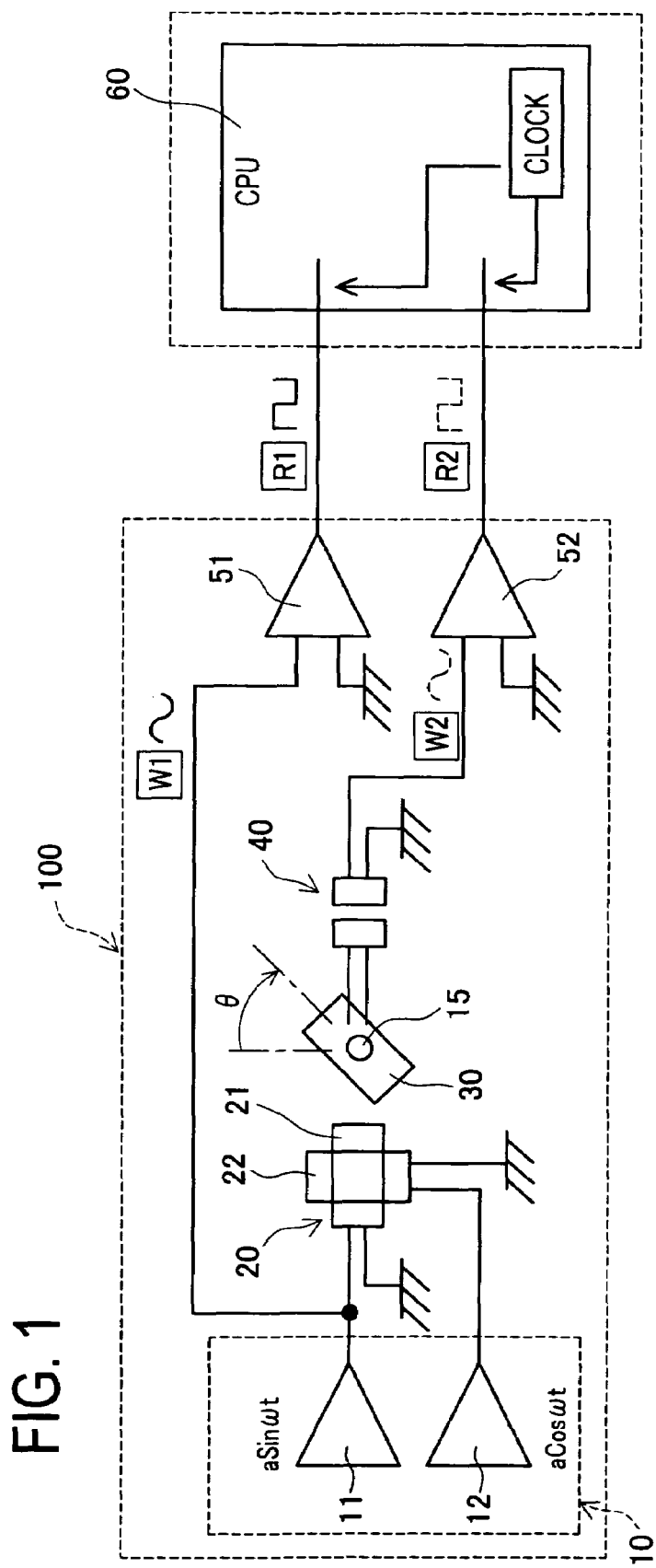
FIG. 1 is a conceptual diagram of an angle detection device in a first embodiment.
Figure 2:
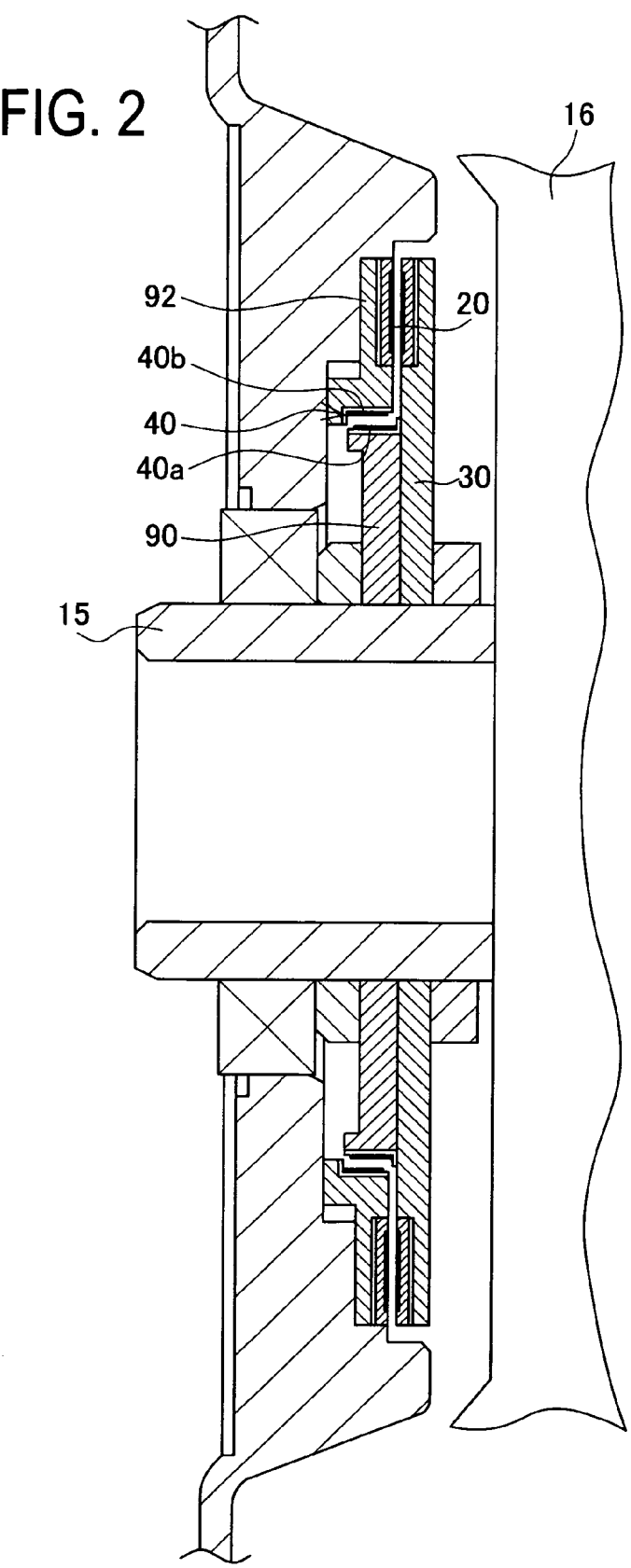
FIG. 2 is an example of a sectional view of parts of the resolver around a motor shaft in the first embodiment.

A first embodiment will be first explained. FIG. 1 is a conceptual diagram of an angle detection device in the first embodiment. FIG. 2 is a sectional view of parts of the resolver 100 around a motor shaft 15.

The resolver 100 includes an excitation signal generator 10, an excitation coil 20, a rotor 30, a rotary transformer 40, a first comparator 51, and a second comparator 52.

The excitation signal generator 10 includes a first excitation signal generator 11 and a second excitation signal generator 12. The first excitation signal generator 11 can output a sine wave; a Sin ωt. The second excitation signal generator 12 can output a cosine wave; a Cos ωt. The motor shaft 15 is a driving shaft of a vehicle itself not shown or a shaft rotatable in synchronization with the driving shaft. The motor shaft 15 is connected to a motor 16 as shown in FIG. 2. A rotor 30 is fixedly mounted on the motor shaft 15 and will rotate together with the motor shaft 15.

The excitation coil 20 includes a first excitation coil 21 and a second excitation coil 22. The first excitation coil 21 is electrically connected to the first excitation signal generator 11. The second excitation coil 22 is electrically connected to the second excitation signal generator 12.

The excitation coil 20 is formed in a pattern on a printed board as shown in FIG. 2.

The rotor 30 is electrically connected to the rotary transformer including a pair of components (e.g. a rotating part and a stationary part) 40a and 40b. The rotary transformer 40 is electrically coupled to the second comparator 52. This transformer 40 serves as a detection circuit of the invention. One component 40a of the rotary transformer 40 is formed on an annular printed board on a plate 90 separate from the rotor 30 as shown in FIG. 2. The other component 40b of the rotary transformer 40 is formed on a printed board on an inner surface of a bracket 92 provided on a housing of the motor. Further, the first comparator 51 is electrically connected to the first excitation signal generator 11.

The first comparator 51 and the second comparator 52 are electrically coupled to the controller 60.

The controller 60 is a CPU for controlling a vehicle. Alternatively, a special CPU may be provided separately from the controller 60. Not only the controller 60 but also a general-purpose CPU includes a free running counter function and an input capture function. With the use of those functions, the angle information of the resolver 100 can be obtained without use of a special resolver/digital converter to the resolver 100.

Figure 3:
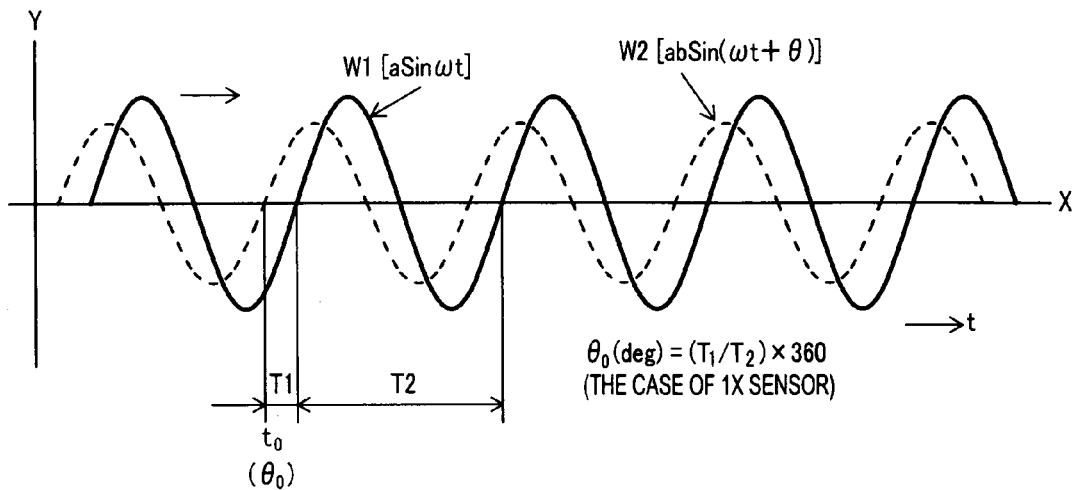
FIG. 3 is a graph showing waveforms of signals generated in the resolver while a motor shaft is not rotating in the first embodiment.
Figure 4:
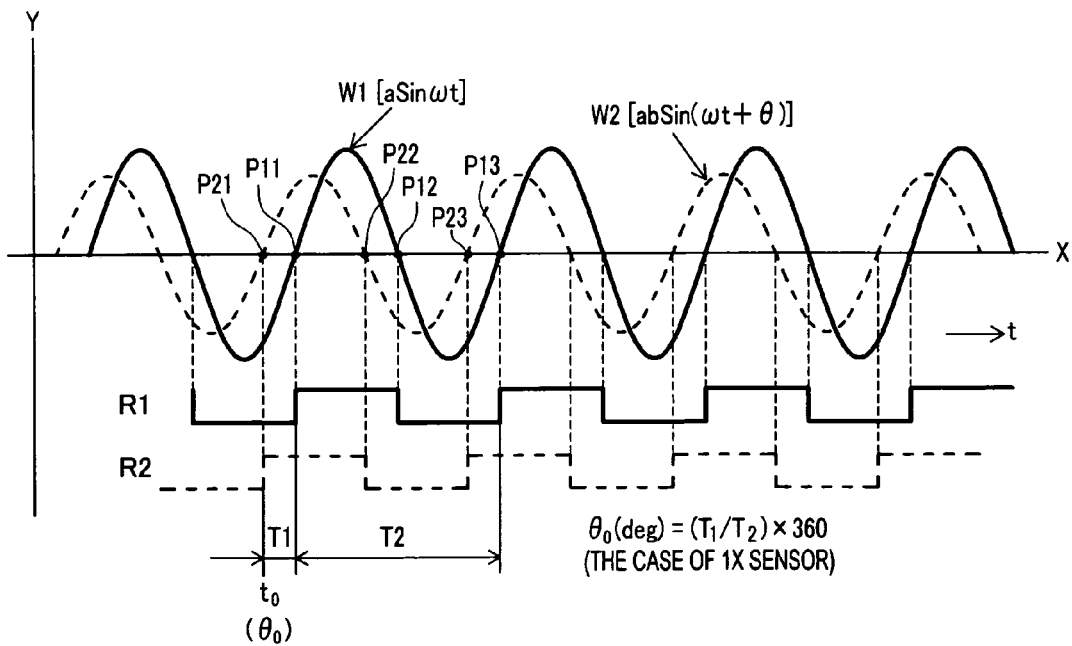
FIG. 4 is a graph showing waveforms in detecting rectangular waves corresponding to an excitation signal and an output signal shown in FIG. 3 in the first embodiment.

The angle detection device in the first embodiment having the above configuration works as follows. FIG. 3 is a graph showing waveforms of signals generated in the resolver 100 while the motor shaft 15 is not rotating. FIG. 4 is a graph showing the waveforms in detecting rectangular waves corresponding to the signals shown in FIG. 3. In the graphs, an X axis indicates time and a Y axis indicates amplitude. In FIG. 3, an excitation signal W1 and an output signal W2 are plotted.

Those excitation signal W1 and output signal W2 are generated in the following manner.

Firstly, the first excitation signal generator 11 creates a sine wave a Sin ωt, which is transmitted to the first excitation coil 21 and the first comparator 51 respectively. This sine wave a Sin ωt is transmitted as the excitation signal W1.

On the other hand, the second excitation signal generator 12 creates a cosine wave a Cos ωt, which is transmitted as a signal to the second excitation coil 22. When the sine wave a Sin ωt and the cosine wave a Cos ωt are applied to the first excitation coil 21 and the second excitation coil 22 respectively as above, excitation voltage is produced in the excitation coil 20. Accordingly, induced voltage induced by the excitation voltage is generated in the rotor 30.

The induced voltage generated in the rotor 30 is transmitted to the second comparator 52 through the rotary transformer 40.

The output signal W2 transmitted to the second comparator 52 is determined by an expression:

$$a\ Sin\ \omega t \times b\ Cos\ \theta + a\ Cos\ \omega t \times b\ Sin\ \theta = ab\ Sin(\omega t + \theta).$$

Time $t_0$ is determined by use of the thus obtained excitation signal W1 and output signal W2.

In FIG. 3, time T1 is a phase difference time and time T2 is one cycle of the excitation signal W1. Angle $\theta_0$ is calculated in principle by an expression: $\theta_0 = (T1/T2) \times 360$.

The angle $\theta_0$ is the angle of the rotor 30 at time $t_0$. This angle information is utilized for vehicle control of the controller 60.

To detect a zero cross point of each of the excitation signal W1 and the output signal W2, the first and second comparators 51 and 52 have to be used. The following signal processing is executed to obtain a first rectangular wave R1 and a second rectangular wave R2 shown in FIG. 4.

The second comparator 52 detects a zero cross point from the waveform of induced voltage supplied from the rotary transformer 40 as mentioned above.

Specifically, as shown in FIG. 4, the output signal W2 changes its polarity reversely at a first zero cross point P21, a second zero cross point P22, and a third zero cross point P23, at each of which the output signal W2 intersects with the X axis. Thus, the second comparator 52 can detect a rising edge or a falling edge of the output signal W2.

In other words, if the output signal W2 rises at the time when the first zero cross point P21 is detected, it falls down at the second zero cross point P22 and rises at the third zero cross point P23, which corresponds to one wavelength. As above, the second rectangular wave R2 can be created based on intervals of the signals detected by the second comparator 52.

A signal of the second rectangular wave R2 generated from this zero cross timing is transmitted to the controller 60.

On the other hand, the first comparator 51 also detects a zero cross point from the sine wave a Sin ωt transmitted from the first excitation signal generator 11.

Specifically, as shown in FIG. 4, the excitation signal W1 changes its polarity reversely at a first zero cross point P11, a second zero cross point P12, and a third zero cross point P13 at each of which the signal W1 intersects the X axis. Thus, the first comparator 51 can detect the rising or falling of the excitation signal W1.

Similarly, if the excitation signal W1 rises at the first zero cross point P11, it falls down at the second zero cross point P12 and rises at the third zero cross point P13, which corresponds to one wavelength. Thus, the first rectangular wave R1 can be created based on intervals of the signals detected by the first comparator 51.

The signal of the first rectangular wave R1 generated from this zero cross timing is transmitted to the controller 60.

From the thus obtained first and second rectangular waves R1 and R2, the time T1 and the time T2 are obtained by use of a reference clock of the controller 60. The angle θ of the rotor 30 can thus be determined.

Figure 5:
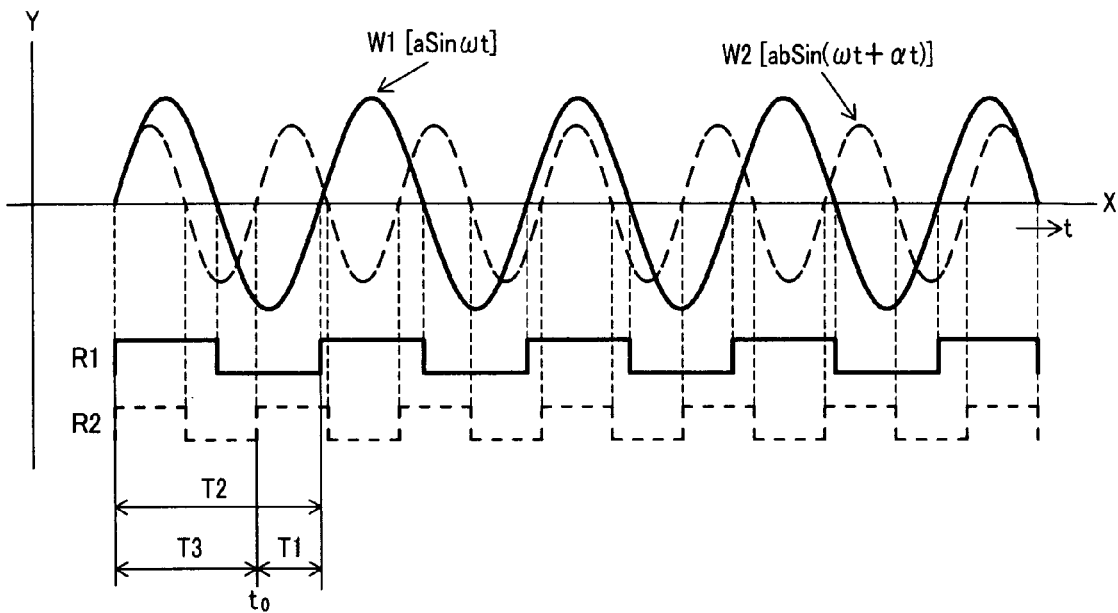
FIG. 5 is a graph showing waveforms of signals generated in the resolver while the motor shaft is rotating in the first embodiment.

FIG. 5 is a graph showing waveforms of the signals generated in the resolver 100. FIG. 5, differently from FIGS. 3 and 4, shows a state where the rotor 30 is rotating. That is, θ is a function of t and thus an expression, θ=αt, is established. Accordingly, the phase difference between the excitation signal W1 and the output signal W2 will change with time.

If a of the output signal W2 is larger than zero (α>0), the output signal W2 is shorter in wavelength than the excitation signal W1 as shown in FIG. 5. In this case, the angle θ can be determined in a similar way to above.

The angle θ can be calculated by using time T3 corresponding to one wavelength of the output signal W2, time T2 corresponding to one wavelength of the excitation signal W1, and time T1 calculated by subtracting T3 from T2. That is, $\theta_0 = (T1/T2) \times 360$.

However, the time T2 is constant. The time T1 is therefore equal to a value calculated by subtracting T3 from T2. In other words, the angle $\theta_0$ can be calculated by measuring the time T3 required from a preceding rising of the first rectangular wave R1 to the rising of the second rectangular wave R2.

The angle $\theta_0$ can be determined by an expression:

$$\theta_0 = ((T2-T3)/T2) \times 360.$$

As above, the angle $\theta_0$ can be obtained at the moment the time T3 is measured and the angle $\theta_0$ at time $t_0$ can be detected.

Figure 6:
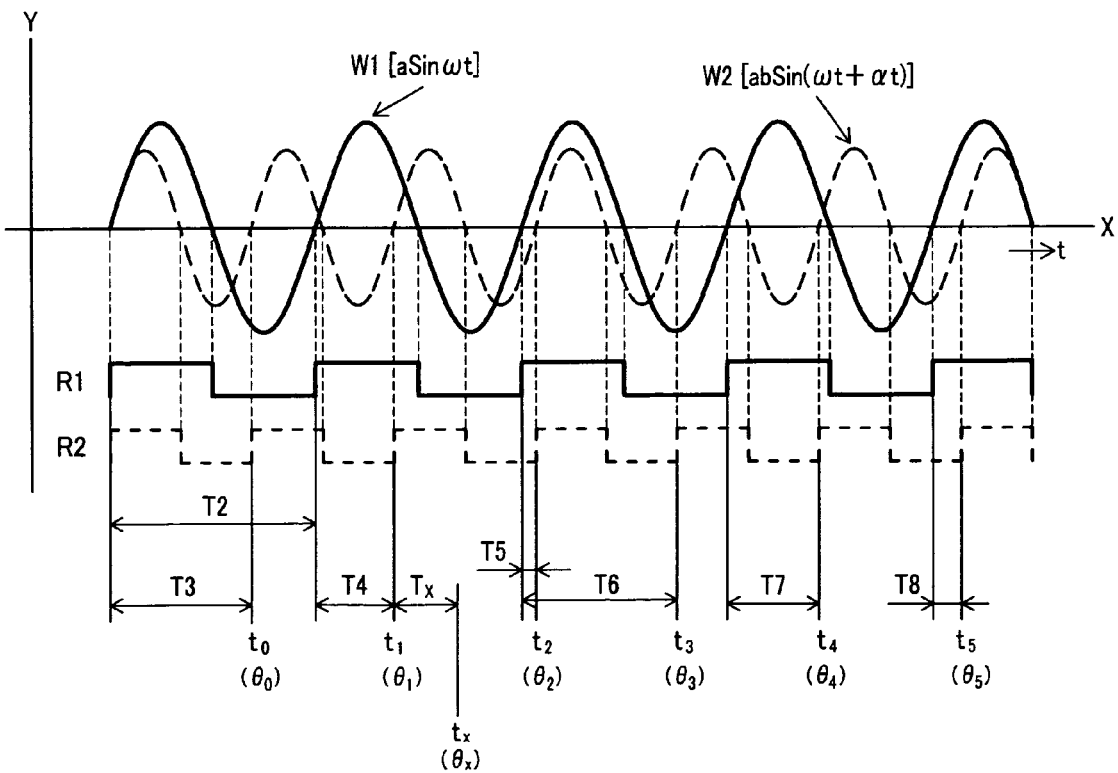
FIG. 6 is a graph showing a relationship between the signal waveforms and the angles determined from the signals generated in the resolver in the first embodiment.

FIG. 6 is a graph showing a relationship between the signal waveforms and the angles determined from the signals generated in the resolver 100.

The angle θ can be determined at the zero cross points of the output signal W2 as shown in FIG. 6. For example, the angle θ at time $t_4$ is determined by an expression: $\theta_4 = ((T2-T7)/T2) \times 360$. Other angles $\theta_1$, $\theta_2$, $\theta_3$, $\theta_5$ can also be calculated in the same manner. In this way, the angle θ at each zero cross point of the second rectangular wave R2 can be determined.

The above processing is executed in the controller 60 shown in FIG. 1.

Figure 7:
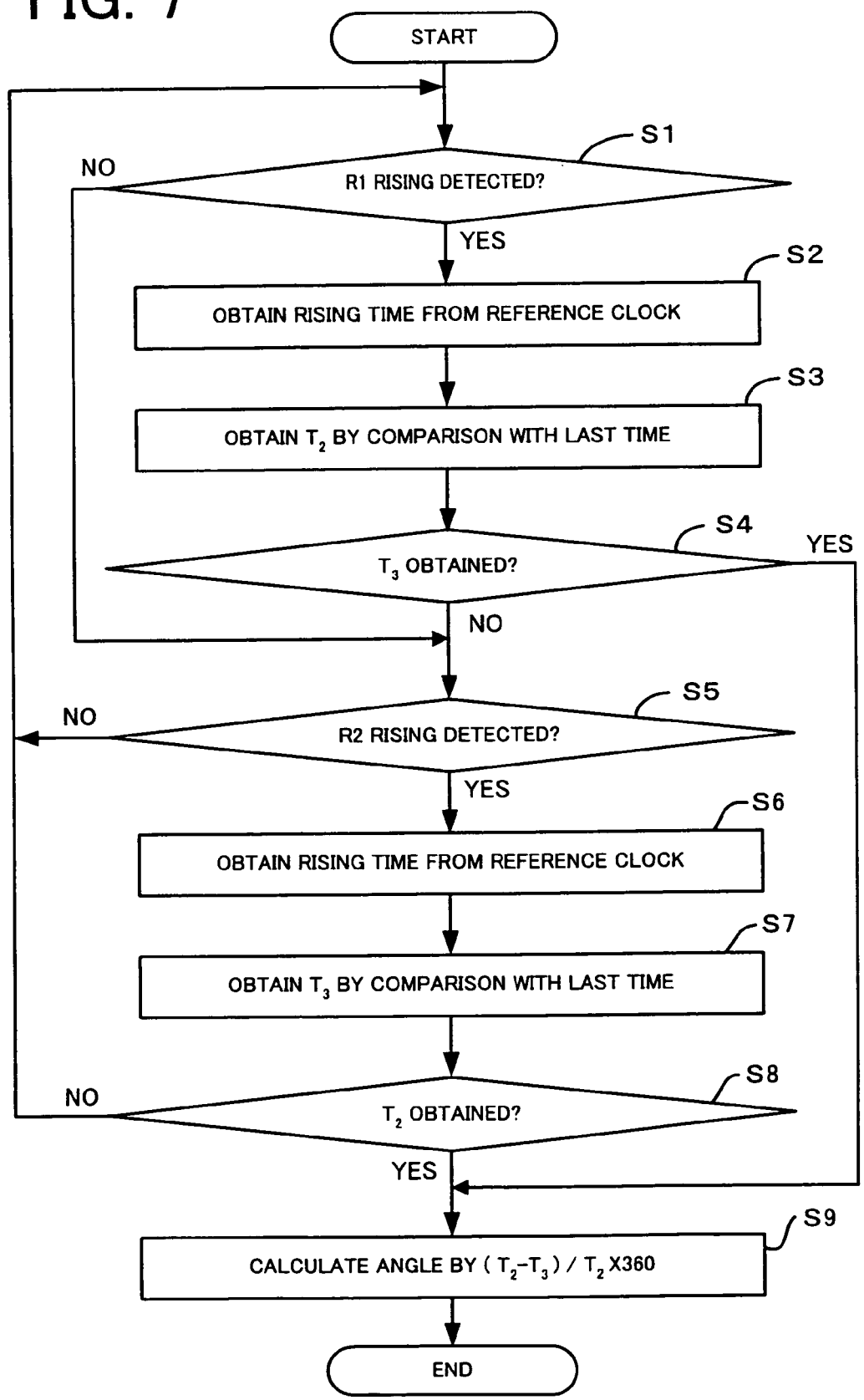
FIG. 7 is a flowchart to briefly explain internal processing in a controller for vehicle control in the first embodiment.

FIG. 7 is a flowchart to briefly show the processing in the controller 60, corresponding to the processing for the state shown in FIG. 5.

In S1, it is determined whether or not the rising of the first rectangular wave R1 is detected. If the rising of the first rectangular wave R1 is detected (S1: YES), the processing advances to S2. If the rising is not detected (S1: NO), the processing advances to S5.

In S2, the rising time of the first rectangular wave R1 is obtained from a reference clock. In the case shown in FIG. 5, the rising time of the first rectangular wave R1 is checked by comparison with the reference clock internally contained in the controller 60. The flow then goes to S3.

In S3, the time T2 is obtained by comparison with a previous rising time. Since the current rising time of the first rectangular wave R1 is already detected, the time T2 is obtained from a difference between the previous rising time and the current rising time. In FIG. 5, it corresponds to a difference between the start time and the current rising time. The processing advances to S4.

In S4, it is determined whether or not the time T3 has been obtained. If the time T3 has been obtained (S4: YES), the flow goes to S9. If the time T3 has not been obtained (S4: NO), the flow goes to S5.

In S5, it is determined whether or not the rising of the second rectangular wave R2 is detected. If the rising of the second rectangular wave R2 is detected (S5: YES), the flow advances to S6. If not (S5: NO), the flow returns to S1.

In S6, the rising time of the second rectangular wave R2 is obtained from the reference clock. In the case shown in FIG. 5, the rising time $t_0$ of the second rectangular wave R2 is checked by comparison with the reference clock of the controller 60. The flow then goes to S7.

In S7, the time T3 is obtained by comparison with a previous rising time. Since the current rising time $t_0$ of the second rectangular wave R2 is already detected, the time T3 is obtained from a difference between the previous rising time and the current rising time. In FIG. 5, it corresponds to a difference between the start time and the current rising time. The processing advances to S8.

In S8, it is determined whether or not the time T2 has been obtained. If the time T2 has been obtained (S8: YES), the flow goes to S9. If the time t2 has not been obtained (S8: NO), the flow returns to S1. If the step S3 has been executed, it represents that the time T2 has been obtained. However, the output signal W2 is shorter in period than the excitation signal W1 as shown in FIG. 5 and hence the step S7 first follows the step S1 to detect the time T3 and then the step S3 is conducted to detect the time T2.

In S9, the angle is determined based on the times T2 and T3. The angle $\theta_0$ can be determined by the expression of $((T2-T3)/T2) \times 360$.

The controller 60 executes the internal processing along the flowchart to obtain the angle information.

As above, the controller 60 can acquire the angle information of the motor shaft 15 from the resolver 100 according to the flowchart shown in FIG. 7, but basically will obtain the angle information at the rising timing of the second rectangular wave R2.

However, there is a case where the angle information is requested at another timing for control. For instance, when an angle detection request is made at time $t_x$ as shown in FIG. 6, the above method needs to wait time $t_2$ at which any information is output.

If last but one angle information and time information have been stored, the angle information at time $t_x$ may be estimated based on those data.

In other words, if the angle detection request is made at time $t_x$ in FIG. 6, the angle $\theta_x$ can be estimated by use of a previous change rate determined based on the angle $\theta_0$ at time $t_0$ and the angle $\theta_1$ at time $t_1$.

This is calculated by an expression:

$$\theta_x = \theta_1 + (\theta_1 - \theta_0) \times ((t_x - t_1)/(t_1 - t_0)).$$

The first embodiment shows the aforementioned configurations and operations and thus can provide the following advantages.

A first advantage is that the angle detection device can provide the angle information with higher accuracy.

Specifically, the resolver 100 includes the excitation signal generator 10 which generates a sine wave a Sine ωt and a cosine wave a Cos ωt as the excitation signal W1, the rotor 30 which receives the excitation signal W1, and the rotary transformer 40 which detects the output signal W2 of the rotor 30. This resolver 100 detects the angle information of the rotor 30. The angle detection device further includes the controller 60 which outputs the angle information at each zero cross point of the output signal W2 detected by the rotary transformer 40. Accordingly, the instantaneous angle information at each zero cross point of the output signal W2 is output. Such output of the instantaneous angle information at each zero cross point of the output signal W2 makes it possible to enhance the accuracy of the angle information without causing a time lag which occurs in the instantaneous angle information at each zero cross point of the excitation signal W1.

In the case where the conventional resolver is used to detect an angle by using the phase difference detection method as mentioned in the related art section, the angle of the rotor 30 is output at each zero cross point of the excitation signal W1 in order to obtain an angle θ at prescribed timing according to requests of a vehicle-mounted CPU for vehicle control or the like.

However, the zero cross points of the excitation signal W1 differ from the zero cross points of the output signal W2. Accordingly, when the angle θ of the rotor 30 is obtained at a zero cross point of the excitation signal W1, the rotor 30 if rotating at high speed is advancing at that time. Thus, the exact angle information could not be output from the resolver 100.

Since the rotation speed of the rotor 30 changes, the angle information also could not be compensated accurately.

In the present embodiment, therefore, the angle information of the rotor 30 is obtained at each zero cross point of the output signal W2. Accordingly, the angle information can be real time obtained from the angle detection device.

The rotation direction of the rotor 30 is set so that the output signal W2 leads in phase with respect to the excitation signal W1. Accordingly, when the angle detection device is used for detection of a vehicle drive motor, the intervals between the zero cross points during vehicle forward movement can be shortened than the intervals between the zero cross points during vehicle stop.

In other words, as shown in FIGS. 5 and 6, the period of the output signal W2 can be shortened as compared with the excitation signal W1. This is an advantage resulting from the rotation of the rotor 30 of the resolver 100.

Figure 8:
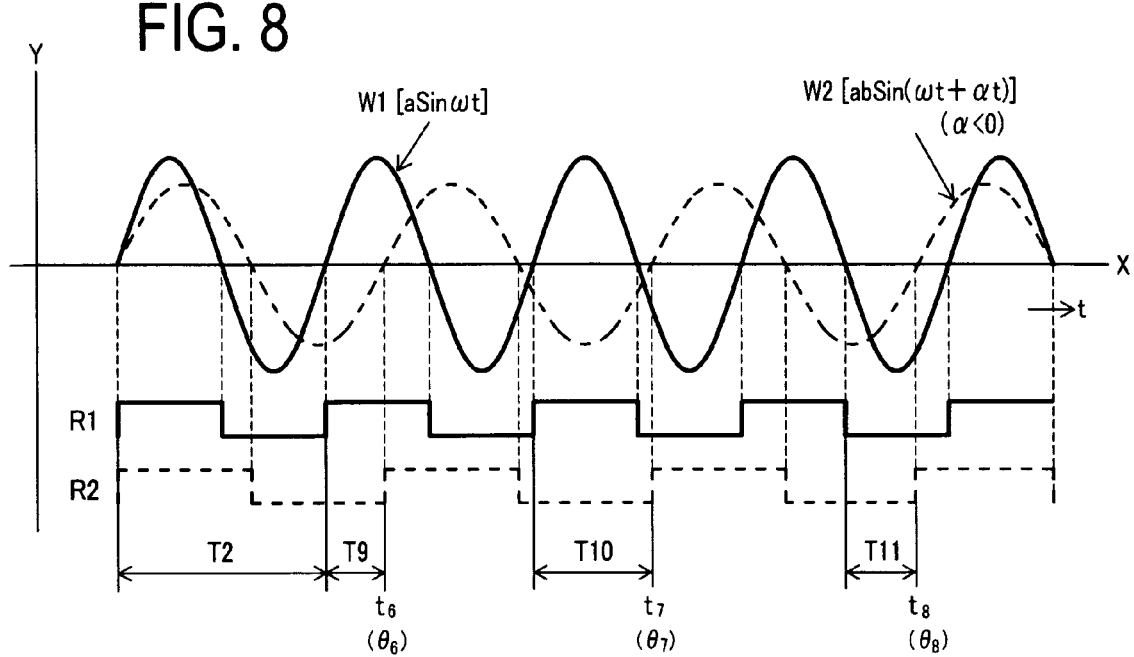
FIG. 8 is a graph showing waveforms of signals generated in the resolver while the motor shaft is reversely rotating in the first embodiment.

FIG. 8 is a graph showing waveforms of signals generated in the resolver 100 while the rotor 30 is reversely rotating. During reverse rotation of the rotor 30, that is, when the motor shaft 15 is reversely rotating to move a vehicle backward, α is less than zero (α<0). Thus, the output signal W2 becomes longer in wavelength than the excitation signal W1.

As described above, the output signal W2 is shorter in wavelength than the excitation signal W1 during normal rotation of the rotor 30 as shown in FIGS. 5 and 6. For example, assuming that the frequency of the excitation signal W1 is 10 kHz, the period of the output signal W2 becomes 100 μs or less. Accordingly, when the motor shaft 15 is rotated at high speed for forward movement of the vehicle, the period of the output signal W2 becomes shorter than that of the excitation signal W1. Much angle information and more accurate information can be obtained accordingly.

On the other hand, when the motor shaft 15 is reversely rotated for backward movement of the vehicle, the period of the output signal W2 becomes longer than that of the excitation signal W1. However, in general, vehicles are rarely moved back at high speeds and thus the lengthened period of the output signal W2 is hardly problematic. Further, vehicles are moved backward with less frequency as compared with forward. Severer control is therefore required during vehicle forward movement. Even if the period of the output signal W2 is lengthened as in FIG. 8, resulting in deterioration in the accuracy of detecting the angle of the motor shaft 15, it will hardly cause any problem.

A second advantage is to a reduced cost of the angle detection device.

A free running counter function and an input capture function of the controller 60 are used as a resolver/digital converter. Accordingly, a general CPU may be used in place of a special resolver/digital converter.

The price of a general CPU is decreasing. In the case where the angle detection device is mounted in a vehicle, further, a CPU for control of the vehicle may be used. Thus, the angle detection device will be provided at low cost.

The resolver of amplitude ratio detecting type disclosed in JP11-118520A would require a high-speed A/D converter and conversion by Fourier transformation, which are large burden on a hardware side and a software side. Further, total cost of a sensor system is high.

According to the first embodiment, on the other hand, the first and second comparators 51 and 52 have only to be provided. This can achieve a large cost reduction.

A third advantage is that the excitation signal generator 10 generates a sin wave a Sin ωt and a cosine wave a Cos ωt in synchronization with the reference clock of the controller 60, so that the controller 60 can precisely detect the time of each zero cross point of the output signal W2.

For instance, even when the reference clock of the controller 60 lags or leads due to temperature drift, the reference clock of the same CPU is used as the resolver/digital converter for counting and therefore it is possible to cancel the influence of the internal temperature rise. Consequently, the angle information of the resolver 100 can be precisely detected.

A fourth advantage is as follows. When angle information is requested at a certain time $t_x$ between a zero cross point and a next zero cross point, the angle information at the requested time is estimated by calculation based on an immediate preceding angle change of the rotor 30. Accordingly, the angle information of the motor shaft 15 at that moment can be provided in response to a request from a controller side (a vehicle-mounted CPU for vehicle control).

Based on the immediate preceding angle change, the angle at that moment is estimated. It is therefore possible to maintain the angle detection accuracy at high level.

In the case where the angle detection device is mounted in a vehicle, there is the increasing needs for obtaining, at any given time, the angle of a vehicle drive motor rotating at high speed to sensitively control the vehicle.

In the case where the angle $\theta_x$ is calculated by an expression:

$$\theta_x = \theta_1 + (\theta_1 - \theta_0) \times ((t_x - t_1)/(t_1 - t_0)),$$

it is estimated based on the immediate preceding angle change. An error (deviation) thereof is problematic.

When the angle detection device is arranged such that the time T2 corresponding to a detection interval is 100 μs and 1×, assuming that the vehicle drive motor is accelerated at an angular acceleration of 10000 rpm/s, the above calculation method provides the angle $\theta_x$ with about a maximum error of about 0.0006. This estimation error will be less problematic for vehicle control.

Consequently, it is advantageous to obtain the angle information at any angle information request time $t_x$.

A fifth advantage is as follows. The angle information is calculated based on the time T1 corresponding to the phase difference between the output signal W2 of the rotor 30 and the excitation signal W1 and the time T2 corresponding to the wavelength of the excitation signal W1. Therefore, even when the phase of the excitation signal W1 changes as the temperature of the resolver 100 rises, the phase of the output signal W2 changes in a similar manner, the phase difference ratio between the excitation signal W1 and the output signal W2 remains unchanged. This makes it possible to cancel the phase change of the excitation signal W1 resulting from the temperature change of the resolver 100 and thus improve the angle detection accuracy.

Second Embodiment

Figure 9:
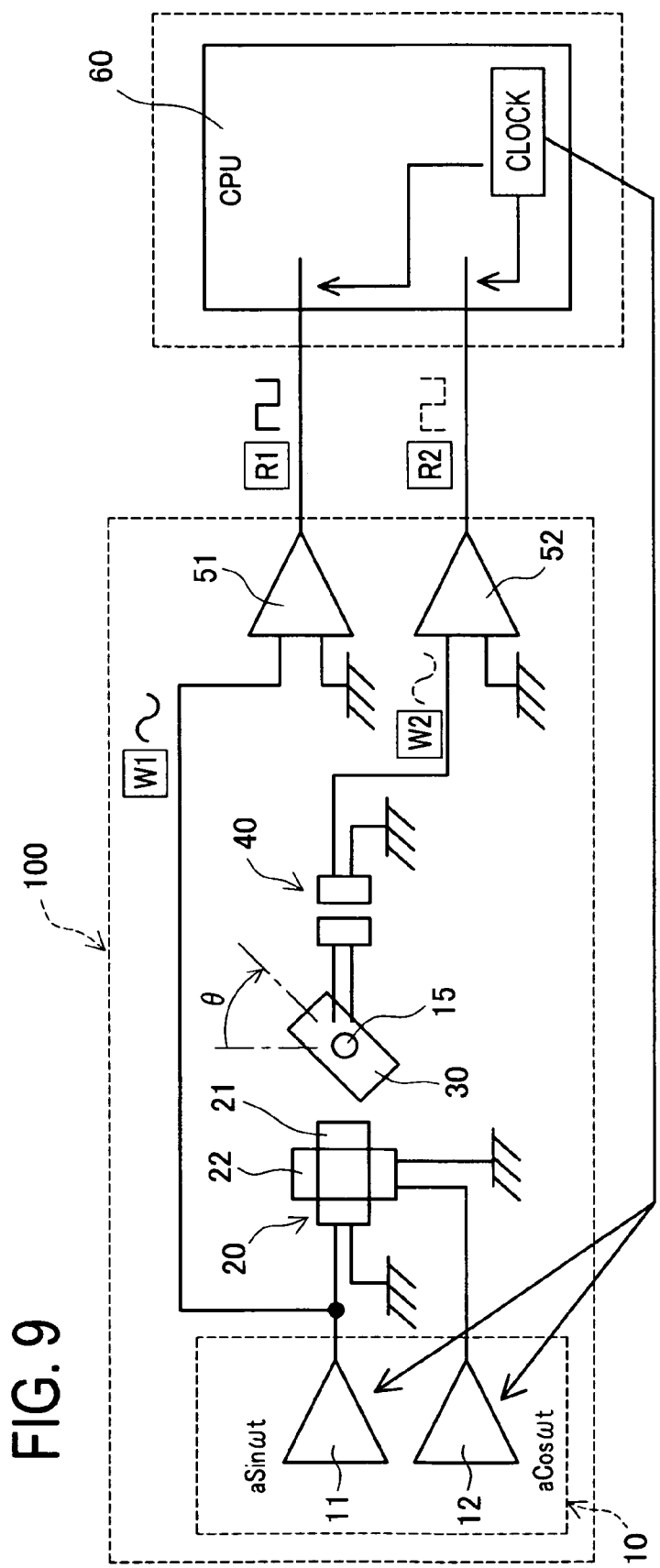
FIG. 9 is a conceptual diagram of an angle detection device in a second embodiment.

A second embodiment will be explained below. FIG. 9 is a conceptual diagram of an angle detection device of the second embodiment. The angle detection device of this embodiment is identical in structure to the angle detection device of the first embodiment, excepting that the first excitation signal generator 11 and the second excitation signal generator 12 use the reference clock of the controller 60.

The first excitation signal generator 11 and the second excitation signal generator 12 create a sine wave a Sin ωt and a cosine wave a Cos ωt with use of the reference clock of the controller 60, so that those sine wave a Sin ωt and cosine wave a Cos ωt can be generated in sync with the reference clock of the controller 60.

Since the sine wave a Sin ωt and the cosine wave a Cos ωt are synchronous with the reference clock of the controller 60, there is no need to detect each rising timing of the first rectangular wave R1 obtained from the excitation signal W1. The time T2 is a multiple number of the reference clock of the controller 60. Accordingly, the controller 60 can grasp the time T2 without measuring it.

FIG. 10 is a flowchart to briefly explain the internal processing in the controller 60. This internal processing is made on the state shown in FIG. 5.

In S11, it is determined whether or not the rising of the second rectangular wave R2 is detected. If the rising of the second rectangular wave R2 is detected (S11: YES), the flow advances to S12. If not (S11: NO), the processing waits until the rising of the second rectangular wave R2 is detected.

In S12, the rising time of the second rectangular wave R2 is obtained from the reference clock. The flow goes to S13 in which the time T3 is obtained by comparison with a previous rising time. A step S14 then follows.

In S14, the angle is determined based on the times T2 and T3. The angle $\theta_0$ can be determined by the expression of $((T2-T3)/T2) \times 360$. As above, the controller 60 can acquire the angle information of the motor shaft 15.

In FIG. 10 in the second embodiment, since there is no need for measuring the time T2, the steps S1 to S4 and S8 shown in FIG. 7 in the first embodiment are unnecessary. The flowchart of FIG. 10 therefore corresponds to the flowchart of FIG. 7 except the steps S1 to S4 and S8 and provides almost the same operations as those in the first embodiment.

The second embodiment with the above configurations and operations can provide the following advantages.

The excitation signal generator 10 of the resolver 100 generates a sine wave a Sine at and a cosine wave a Cos ωt in sync with the reference clock of the controller 60. Accordingly, the controller 60 can accurately detect the time of each zero cross point of the output signal W2.

For instance, even when the reference clock of the controller 60 lags or leads due to temperature drift, the reference clock of the same CPU is used as the resolver/digital converter for counting. Thus, the angle θ is determined with use of the same reference clock. It is therefore possible to cancel the influence of the internal temperature rise and detect the angle information with high accuracy.

The angle detection device of the second embodiment does not need to measure the time T2. Thus, the load on the controller 60 can be reduced as compared with in the first embodiment.

For the conventional resolver 100, a special resolver/digital converter is provided and the controller 60 does not need for calculation of the angle information. However, in the first and second embodiments, the controller 60 operates to obtain the angle information and hence bears a certain degree of computation load. Such load is desired to be small.

Since detecting of the time T2 is not performed, the number of steps can be reduced to about half as seen from FIGS. 7 and 10 and the computation load on the controller 60 can also be decreased. This configuration will not cause such an increase in specification of the controller 60 as to lead to a cost increase. Unlike the conventional phase difference detecting type resolver, the angle detection device of the present embodiment needs no special resolver/digital converter and can achieve a cost reduction.

The present invention is explained as above referring to the embodiments but is not limited thereto. The invention may be embodied in other specific forms without departing from the essential characteristics thereof.

For instance, in the configuration diagram showing the resolver 100 of the first embodiment, the coil 20 and the rotary transformer 40 are formed in patterns on the printed boards. Alternatively, another configuration may be adopted.

In the above first and second embodiments, the controller 60 is used for calculation of the angle information. Alternatively, another inexpensive commercially-available CPU may be additionally used to reduce a load on the controller 60.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. An angle detection device including:
   a resolver including:
      an excitation signal generator which generates a sine wave and a cosine wave as excitation signals;
      a rotor which receives the excitation signals and outputs a signal representing an angle of the rotor; and
      a detection circuit which detects the output signal of the rotor, the resolver being adapted to detect angle information of the rotor; and
   a resolver/digital converter which outputs the angle information at a zero cross point of the output signal detected by the detection circuit,
   wherein a main rotation direction of the rotor is set so that the output signal of the rotor leads in phase with respect to the excitation signal.

2. The angle detection device according to claim 1, wherein the angle information between the zero cross point and a next zero cross point is estimated based on an immediate preceding angle change of the rotor.

3. The angle detection device according to claim 2, wherein the resolver/digital converter is a CPU, and a free running counter function and an input capture function of the CPU are used to obtain the angle information.

4. The angle detection device according to claim 3, wherein the excitation signal generator is arranged to generate the sine wave and the cosine wave in sync with a reference clock of the CPU.

5. The angle detection device according to claim 1, wherein the resolver/digital converter is a CPU, and a free running counter function and an input capture function of the CPU are used to obtain the angle information.

6. The angle detection device according to claim 5, wherein the excitation signal generator is arranged to generate the sine wave and the cosine wave in sync with a reference clock of the CPU.

7. The angle detection device according to claim 1, wherein the angle information is calculated based on a ratio of a phase difference between the output signal of the rotor and the excitation signal and a period of the excitation signal.

8. An angle detection device including:
   a resolver including:
      an excitation signal generator which generates a sine wave and a cosine wave as excitation signals;
      a rotor which receives the excitation signals and outputs a signal representing an angle of the rotor; and
      a detection circuit which detects the output signal of the rotor,
   the resolver being adapted to detect angle information of the rotor; and
   a resolver/digital converter which outputs the angle information at a zero cross point of the output signal detected by the detection circuit,
   wherein the angle information between the zero cross point and a next zero cross point is estimated based on an immediate preceding angle change of the rotor.

9. The angle detection device according to claim 8, wherein the resolver/digital converter is a CPU, and a free running counter function and an input capture function of the CPU are used to obtain the angle information.

10. The angle detection device according to claim 9, wherein the excitation signal generator is arranged to generate the sine wave and the cosine wave in sync with a reference clock of the CPU.

11. A method for driving an angle detection device including a resolver, comprising the steps of:
- detecting a first angle at a first zero cross point of an output signal of the resolver;
- detecting a second angle at a second zero cross point of an output signal of the resolver, wherein the second zero cross point is after the first zero cross point;
- detecting a third angle at a third zero cross point of the output signal of the resolver, wherein the third zero cross point is after the second zero cross point; and
- calculating angle information between the second zero cross point and the third zero cross point by use of the first angle and the second angle.

12. The method according to claim 11, wherein the angle information is calculated by use of an average angular rate between the first zero cross point and the second zero cross point.

13. The method according to claim 11, wherein the first angle, the second angle and the third angle are calculated based on a ratio of a phase difference between the output signal of the resolver and an excitation signal of the resolver, and a period of the excitation signal.

14. An angle detection device including:
- a resolver including:
  - an excitation signal generator which generates a sine wave and a cosine wave as excitation signals; and
  - a rotor which receives the excitation signals and outputs a signal representing an angle of the rotor; and
- a controller configured to detect angle information of the rotor at a zero cross point of the output signal of the rotor, and estimate the angle information between the zero cross point and a next zero cross point based on an immediate preceding angle change of the rotor.

15. The angle detection device according to claim 14, wherein the controller is a CPU.

16. The angle detection device according to claim 14, wherein the controller is a CPU for controlling a vehicle.

* * * * *